United States Patent [19]

Ealey

[11] Patent Number: 4,934,803
[45] Date of Patent: Jun. 19, 1990

[54] DIFFERENTIAL PRESSURE DEFORMABLE MIRROR

[75] Inventor: Mark A. Ealey, Ayer, Mass.

[73] Assignee: Litton Systems, Inc., Lexington, Mass.

[21] Appl. No.: 420,808

[22] Filed: Oct. 12, 1989

[51] Int. Cl.$^5$ .................... G02B 7/185; G02B 7/195
[52] U.S. Cl. .................................. 350/610; 350/609; 350/607
[58] Field of Search ............... 350/607, 609, 610, 611

[56] References Cited

U.S. PATENT DOCUMENTS

| | | | |
|---|---|---|---|
| 4,239,343 | 12/1980 | Wrench | 350/611 |
| 4,657,358 | 4/1987 | Anthony et al. | 350/629 |
| 4,674,848 | 6/1987 | Aldrich et al. | 350/611 |
| 4,844,603 | 7/1989 | Eitel et al. | 350/611 |

*Primary Examiner*—Bruce Y. Arnold
*Assistant Examiner*—Jay Ryan

*Attorney, Agent, or Firm*—Michael H. Wallach; Robert F. Rotella

[57] ABSTRACT

A deformable mirror construction is disclosed in which a difference in pressure between the front reflecting surface of the deformable mirror and an enclosed chamber behind the mirror's reflecting surface is used to restore the reflecting surface to its undeformed condition after its shape has been deformed by the selective operation of one or more electrodistortive actuators. A pump is associated with the chamber to produce at least a partial vacuum in the enclosed chamber. The use of a pressure differential to influence the shape of the mirror's reflecting surface avoids the need to have the actuators fastened to the reflecting surface, thereby permitting a construction which provides for the easy replacement of actuators. A preferred embodiment of the deformable mirror includes an apparatus for circulating a coolant through the mirror's faceplate to remove heat therefrom.

12 Claims, 2 Drawing Sheets

4,934,803

DIFFERENTIAL PRESSURE DEFORMABLE MIRROR

BACKGROUND OF THE INVENTION

1. Field of the Invention

This invention relates to deformable mirrors in general, and more particularly to deformable mirrors having replaceable electrodistortive actuators for controlling the shape of the mirror's reflecting surface.

2. Summary of the Prior Art

It is well known in the prior art to use deformable mirrors to correct optical signals for aberrations introduced into a wavefront due to the transmission of an optical signal through a distorting medium, e.g. the Earth's atmosphere. Such deformable mirrors may be used, for example, to correct aberrations introduced into laser signals or optical images imaged by a telescope as they pass through the Earth's atmosphere, or to introduce known aberrations into a laser signal prior to its transmission through the Earth's atmosphere. Examples of deformable mirrors which may be used to perform the foregoing function appear in U.S. Pat. Nos. 3,904,274 and 4,657,358 which are owned by the assignee of the present invention and the teachings of which are incorporated herein by reference. Mirror's of the foregoing type employ a plurality of actuators, for example piezoelectric actuators, which are independently operable to selectively deform areas of a deformable reflecting surface to correct known anomalies contained in an impinging optical signal's wavefront. Signals for driving the actuators to correct the aberrated wavefront may be provided by a wavefront sensing and correction system such as that described in U.S. Pat. No. 3,923,400, the teachings of which are also incorporated herein by reference.

As noted in U.S. Pat. No. 4,657,358, actuators for use in controlling a deformable mirror may be manufactured from stacks of electrodistortive material, for example lead magnesium niobate (PMN) or lead zirconate titanate (PZT). The electrodistortive material is interleaved in the stack with alternating layers of electrical conductors to permit the application of an electrical signal to the material.

Prior known deformable mirrors which utilize stacked electrodistortive material to provide control of the mirror's reflecting surface have been constructed with each actuator rigidly fastened to the member containing the mirror's reflecting surface to permit the reflecting surface to be drawn back by the actuators into an unbiased (or rest) position. Such construction has not provided for ease of repair of a deformable mirror in the event of the failure of one or more actuators. In the event of the failure of an actuator due, for example, to the mechanical failure of an actuator or to the failure of electrical contacts between one or more of the layers of electrodistortive material, the components of the mirror had to be carefully disassembled to effect the removal and replacement or repair of the failed actuator. The disassembly procedure is usually time consuming, frequently difficult, and often impossible to effect due to the spacing between adjacent actuators and the need to prevent damaging good actuators during the repair and reassembly procedure. Consequently, there is a need for a deformable mirror which utilizes electrically operated actuators which may be easily replaced without damaging other actuators during the replacement procedure.

In a related patent application, Ser. No. 266,616 filed Nov. 3, 1988, owned by the owner of the present patent application and the teachings of which are incorporated herein by reference, a construction for a deformable mirror is disclosed in which the mirror's electrodistortive actuators may be easily removed from the mirror's base or support structure for purposes of calibrating and/or replacing one or more of the mirror's actuators. Each actuator includes a threaded portion which is received in a threaded aperture in the base. The position of each actuator with respect to the mirror's deformable reflecting surface may be adjusted by screwing the actuator into its threaded aperture until the top of the actuator just contacts the structure supporting the reflecting surface without deflecting the surface. Further adjustment of the position of each actuator with respect to the mirror's reflecting surface may be used to adjust the initial (or rest) shape (i.e., the extent of deformation) of the mirror's reflecting surface.

While a mirror having replaceable actuators as described above has the advantage of permitting the replacement of one or more of the mirror's actuators, to take advantage of such construction the mirror is required to have a flexible membrane attached to the mirror's faceplate to maintain the contact between the faceplate and the actuators which would normally be supplied by mechanically fastening the actuators to the faceplate. The membrane must be carefully designed and manufactured to insure that a precise downward pressure is applied by it against each actuator to prevent the membrane from introducing undesirable pressure variations and, hence, unwanted surface deformations across the mirror's reflecting surface. The present invention provides an advantage over prior known forms of deformable mirrors in that it avoids the necessity of either mechanically fastening the actuators to the mirror faceplate or the using springs or the like to retract the faceplate. Furthermore, it also avoids the need to provide a reverse electrical bias to the electrodistortive actuators to effect retraction of a deformable mirror's reflecting surface.

SUMMARY OF THE INVENTION

A principal object of the invention is to provide a deformable mirror having electrically operated actuators to selectively deform the mirror's reflecting surface which do not have to be mechanically fastened to the mirror's reflecting surface.

Another object is to provide a deformable mirror which can be used to control the wavefront of high energy laser signals.

Still another object is to provide a deformable mirror having easily-replaceable electrically operated actuators for controlling the shape of the mirror's reflecting surface.

A further object of the invention is to provide an electrically-operated deformable mirror which does not require the use of an electrical signal to retract the mirror's reflecting surface.

The above objects and other advantages are achieved by taking advantage of the ambient atmospheric pressure acting on a deformable mirror's reflecting surface to provide a restoring force to oppose forces selectively generated in the faceplate by electrically-operated actuators pressing against the faceplate. The deformable mirror includes a plurality of electrically operated actuators which are supported by a base having a plurality of threaded apertures. A faceplate is supported above the base by a wall which encloses the space between the base and faceplate to provide an air-tight chamber which may be evacuated by means of a vacuum pump. Each actuator is received in an air-tight, threaded aperture in the base to permit adjustment of the spacing between the top of each actuator and the faceplate. A partial vacuum is established in the chamber between the faceplate and base to permit the ambient atmospheric pressure to force the faceplate into contact with the top end of each actuator. The faceplate may be deformed to a desired shape by selectively applying electrical signals to one or more of the actuators. Elongation of the actuators imparts a force into the faceplate to selectively deform the faceplate into a desired shape. Upon removal of the electrical signals from the actuators, the atmospheric pressure acting on the surface of the faceplate imparts a force into the faceplate to restore the faceplate to its rest (undistorted) position. In the preferred embodiment disclosed herein, the mirror's base and faceplate may be cooled by circulating a coolant therethrough to dissipate heat absorbed in the faceplate.

BRIEF DESCRIPTION OF THE DRAWINGS

The foregoing objects and other advantages of the invention will be readily understood from a detailed description of a preferred embodiment when read in conjunction with the accompanying drawings in which.

DETAILED DESCRIPTION OF A PREFERRED EMBODIMENT

Figure 1:
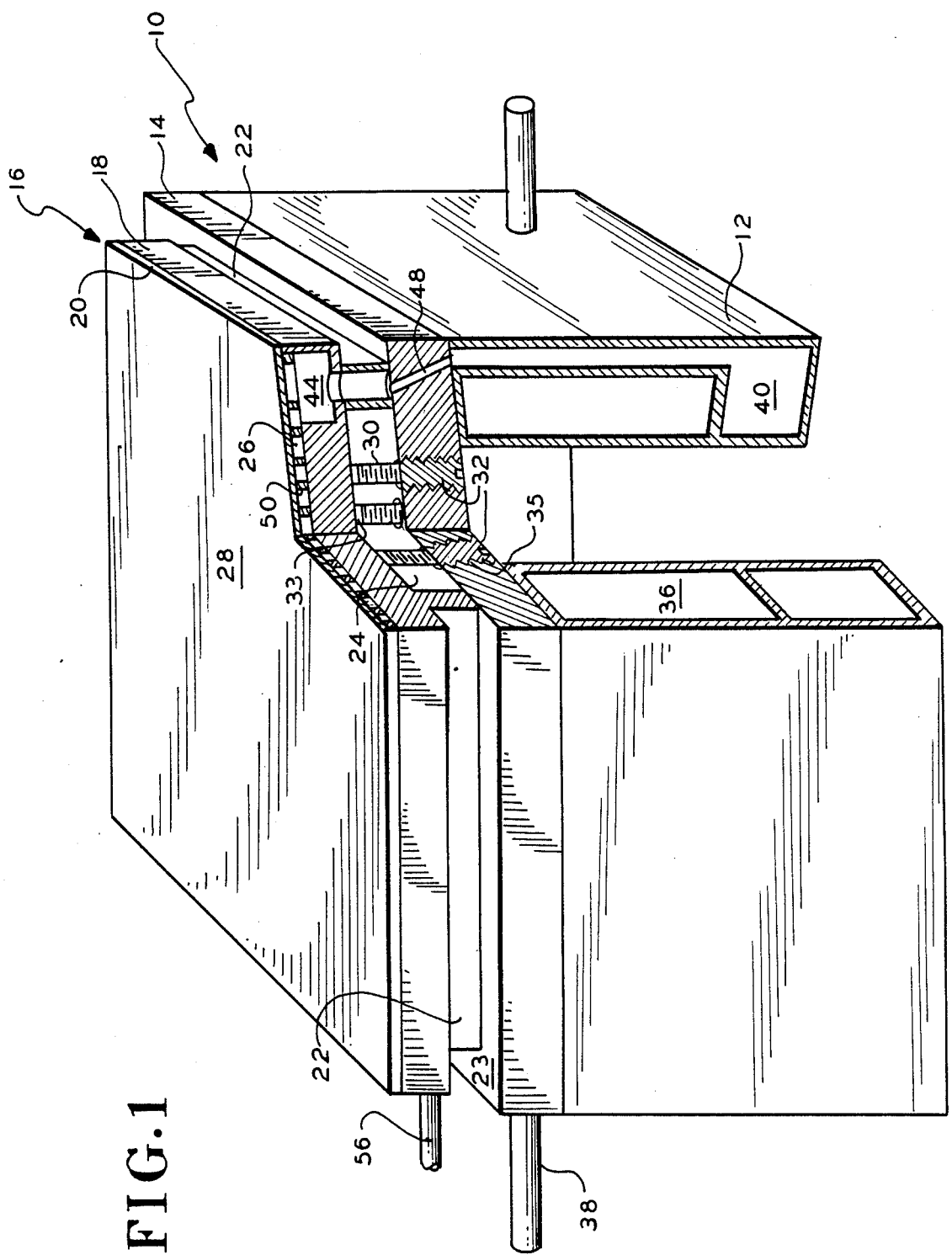
FIG. 1 is a perspective view partially in section showing a deformable mirror constructed in accordance with the teachings of the invention.

Referring to the drawing, FIG. 1 shows a deformable mirror 10 constructed in accordance with the teachings of the invention. The mirror 10 includes a heat exchanger 12 manufactured from a material which has a low coefficient of thermal expansion, for example from silicon. A base 14 is bonded to the heat exchanger using, for example, an epoxy or a frit bond. The base 14 is manufactured from a material which has a thermal coefficient of expansion matched to that of the heat exchanger 12, for example Invar may be used for the base 14 if silicon is used for the heat exchanger 12. The base 14 supports a faceplate shown generally at 16. The faceplate 16 includes a coolant distributor plate 18 and a mirror facesheet 20 bonded to the top surface of the coolant distributor plate 18. A wall 22 is formed with or fastened to the top surface of the base 14 and the lower surface of the coolant distributor plate 18. The wall 22 supports the faceplate 16 above the base 14. Preferably the coolant distributor plate 18 is fastened to the top surface 23 of the base 14 using a material which will permit a vacuum to be maintained within a chamber 24 enclosed by the wall 22.

The facesheet 20 is fastened to the coolant distributor plate 18 around the outer edge of the plate 18 and facesheet 20 using a bond which will be impervious to coolant being pumped across the open space 26 between the facesheet 20 and the coolant distributor plate 18. The facesheet 20 includes a front reflecting surface 28 which may be polished and/or coated with a reflective material, for example aluminum, to permit the reflection of optical signals from the mirror's reflecting surface 28.

Figure 2:
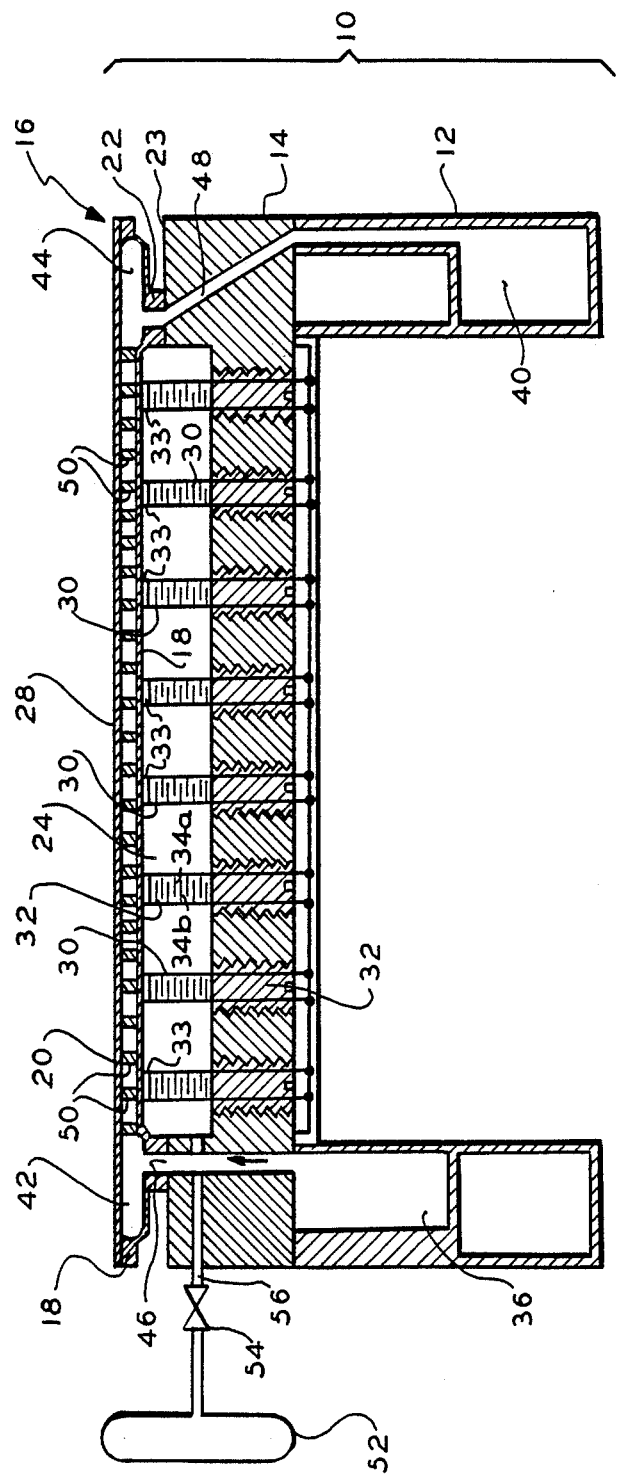
FIG. 2 is a cross-section view of the deformable mirror of FIG. 1.

FIG. 2 shows a series of electrically operated, electrodistortive actuators 30 which may be used to selectively deform the mirror's reflecting surface 28. Each actuator 30 includes layers 32 of electrodistortive material, for example lead magnesium niobate (PMN) interleaved with layers 34a and 34b of conductors. The actuators 30 may be operated by passing electrical signals through selected ones of the actuators 30 to be operated. The magnitude of the electrical signals is proportional to the desired extent of force to be applied by each actuator to the deformable mirror 16 in a manner which is well known to those skilled in the art. Each actuator 30 is supported by a threaded plug 32 which resides in an aperture 35 having threads to receive the threads on each plug 32. The threaded plugs 32 may be adjusted by rotating them within the apertures 35 to permit adjustment of the spacing between each actuator 30 and the faceplate 16. The bottom of the coolant distributor plate 18 includes dimples 33 at those locations where actuators 30 will contact the coolant distributor plate 18. The dimples 33 may be integrally manufactured with the plate 18 or may be separately manufactured and then bonded to the underside of the plate 18 using any suitable bonding process, for example by frit bonding. Preferably the actuators 30 are lined or plated with a material to insure that a vacuum seal can be maintained in the space 24 between the base 14 and the deformable mirror 16, for example with copper plating.

The heat exchanger 12 includes a coolant supply plenum 36 which may be fed a supply of chilled coolant through intake line 38 and a coolant return plenum 40 which receives coolant after it has been passed through the space 26 in the faceplate 16.

FIGS. 1 and 2 show how coolant is circulated between the coolant distributor plate 18 and the facesheet 20. The coolant distributor plate 18 includes coolant manifolds 42 and 44 along opposite edges thereof. Coolant manifold 42 receives coolant from the supply plenum 36 through one or more channels 46 contained in the wall 22 of the coolant distributor plate 18. Coolant is forced by pressure across the coolant distributor plate 18 through the space 26 formed between the facesheet 20 and the distributor plate 18. During its passage through the space 26 the coolant absorbs heat generated in the facesheet 20, due for example to the incomplete reflection of a high energy laser signal reflected from surface 28, and is collected at coolant manifold 44. The coolant is returned to the coolant return plenum 40 in the heat exchanger 12 by passing through one or more channels 48 contained in wall 22 on the side of the faceplate 16 opposite the side on which the coolant was introduced. Heat is conducted away from the facesheet 20 and into the circulating coolant by the support pins 50 which support the facesheet 20.

FIG. 2 shows that means are connected to the hollow chamber 24 between faceplate 16 and base 14 for producing at least a partial vacuum in the chamber 24. These means include an evacuation pump 52 or other means for producing at least a partial vacuum and a pressure regulator 54 which are connected to the chamber 24 through a line 56. Those skilled in the art of deformable mirror construction are aware that retraction of the faceplate after its deformation by operation of actuators 30 is accomplished by either applying a reverse voltage to the actuators 30 to cause them to retract, or by the use of springs or other mechanical means to force the facesheet 20 downward toward its rest position. In the case where the actuators 30 are electrically biased to draw the faceplate back to a retracted or rest position, the actuators 30 must be mechanically fastened, for example by bonding, to the faceplate to permit the retraction force generated in the actuators to pull the faceplate rearward. Such construction prevents the easy removal of actuators, since, if they are bonded to the faceplate, the bond must be broken to remove one or more actuators and, the spacing between adjacent is usually sufficiently small to prevent such removal without endangering damage to either the faceplate or to other actuators in the vicinity of the actuators to be removed.

The construction for the deformable mirror disclosed herein avoids the problems described above by utilizing ambient atmospheric pressure pressing on the faceplate to force the faceplate into a retracted position after the voltage applied to the actuators has been removed. The restoring force imparted on the faceplate is obtained by providing a pressure differential between the ambient atmospheric pressure operating on the front (i.e. reflecting surface) of the faceplate and the rear of the faceplate forming the top of the chamber 24. This differential pressure is obtained by evacuating the chamber 24 utilizing the means for producing at least a partial vacuum noted above. It will be readily apparent to those skilled in the art that excessive pressure imposed on the faceplate 16 by atmospheric pressure, i.e. a condition that would exist if excessive vacuum is maintained within the chamber 24, will cause the reflecting surface 28 of the faceplate 16 to appear dimpled, or to break, due to excessive pressure between the points on the faceplate 16 supported by actuators 30. This condition may be avoided by utilizing the pressure regulator 54 to insure that the differential pressure between the ambient atmospheric pressure and the pressure in the chamber 24 is not excessively great and, therefore, does not impose excessive forces on the faceplate 16 between adjacent actuators 30.

Removal of actuators for repair or replacement may be effected by equalizing the pressure in the chamber 24 to equal that of the ambient atmosphere. As a result of such equalization, the faceplate 16 assumes a planar rest position, without any force being generated between the pads 33 and the actuators 30. Thereafter, the plugs 32 beneath those actuators 30 to be replaced may be unscrewed and the actuators removed after being electrically disconnected from the electronics used to drive the actuators. A new or repaired actuator 30 may be reinstalled by placing it within the aperture 35 in the base. A plug 32 is threaded into the aperture 35 and the actuator 30 is forced against the coolant distributor plate 18 so that the top of the actuator 30 just contacts the dimple 33.

It should be obvious to those skilled in the art that variations in the construction of the above-described deformable mirror may become apparent after review of the disclosure contained herein. It is intended that the described embodiment be merely illustrative of the invention and that the invention be limited only by permissible scope of the appended claims.

I claim:

1. A deformable mirror having a deformable, reflecting surface for selectively controlling the wavefronts of optical signals reflected from said reflecting surface when said deformable mirror is operated in an environment providing a pressure on said reflecting surface, said deformable mirror including:
   a. A base having a plurality of apertures passing therethrough;
   b. A faceplate including a thin, deformable front surface having said reflecting surface on one side thereof for reflecting optical signals therefrom, said faceplate further including a wall on the side of said faceplate opposite said reflecting surface, said wall surrounding the edge of said faceplate, said faceplate being fastened along said wall to said base to form an air-tight chamber between said faceplate and said base;
   c. means connected with the chamber between said faceplate and said base for producing at least a partial vacuum in said chamber;
   d. A plurality of electrically-operated actuators which are selectively operable by the application of an electrical signal thereto to cause the elongation of said actuators, each of said actuators residing in one of said apertures in said base, and positioned so that a first end of each actuator just contacts the rear surface of said facesheet, said actuators selectively imparting known deformations to the reflective surface of said faceplate upon the selective application of electrical signals to said actuators;

whereby said faceplate may be returned to a planar condition after electrical signals are removed from said actuators by the difference in pressure between the environment in which said deformable mirror operates and at least a partial vacuum in said chamber.

2. The deformable mirror of claim 1 further including means for circulating coolant through said faceplate to cool said reflecting surface.

3. The deformable mirror of claim 2 wherein said means for circulating coolant includes at least one chamber contained in said faceplate for receiving said coolant, said coolant being circulated into said chamber through at least a first duct in the wall of said faceplate and removed from said chamber through at least another duct in the wall of said faceplate.

4. The deformable mirror of claim 1 wherein said means connected to said chamber is a vacuum pump.

5. The deformable mirror of claim 1 wherein the pressure applied by said actuators against said faceplate may be adjusted by adjusting the position of said actuators in said base.

6. The deformable mirror of claim 5 wherein the position between said actuators and said faceplate may be adjusted by rotating said actuators in threaded apertures in said base.

7. The deformable mirror of claim 6 wherein the rear surface of said faceplate includes dimples to transfer the forces generated by said actuators into said faceplate when said actuators are elongated.

8. The deformable mirror of claim 6 wherein each of said actuators may be replaced by removing them from said base.

9. A cooled deformable mirror for selectively controlling the wavefronts of optical signals comprising:
   a. A base having a plurality of apertures passing therethrough and at least two coolant channels for conducting coolant through said base;
   b. A faceplate having a facesheet with a reflecting surface on a front side thereof for reflecting optical signals therefrom and a coolant distributor plate having at least one chamber for distributing coolant across the rear surface of said facesheet, said facesheet and said coolant distributor plate being sealed along the edges thereof to form an enclosed chamber for retaining coolant therein, said coolant distributor plate also having a wall on the rear surface of said faceplate, said wall defining an enclosed chamber behind said faceplate, said faceplate being fastened to said base by a continuous seal between the wall of said faceplate and said base to form a vacuum chamber between said faceplate and said base, the reflecting surface of said faceplate being exposed to a known atmospheric pressure;

c. means connected to said vacuum chamber for producing at least a partial vacuum in said chamber lower than the pressure of said atmospheric pressure acting on said faceplate;

d. a plurality of electrically-operated actuators fastened in the apertures in said base, said actuators being positioned so that a first end of each actuator contacts said faceplate, said actuators being connected to electrical control means for producing electrical signals for selectively elongating said actuators to produce known deformations in the reflecting surface of said faceplate;

whereby the faceplate of said deformable mirror is retracted to its undeformed condition by the difference in pressure between the atmospheric pressure on the reflecting side of said faceplate and the pressure in said vacuum chamber when electrical signals applied to said actuators are removed.

10. The cooled deformable mirror of claim 9 further including a heat exchanger having one or more chambers for circulating a coolant therethrough, the base of said cooled deformable mirror being fastened to said heat exchanger.

11. The cooled deformable mirror of claim 10 wherein coolant is circulated between said heat exchanger and said faceplate by passing through the coolant channels in said base.

12. The coolant deformable mirror of claim 11 wherein the apertures in the base for receiving said actuators are threaded, and said actuators are retained in said apertures by threaded plugs received in the threaded apertures.

* * * * *